Feb. 14, 1933.   A. C. LOEDDING   1,897,669
AIRPLANE
Filed Oct. 23, 1930   3 Sheets-Sheet 2
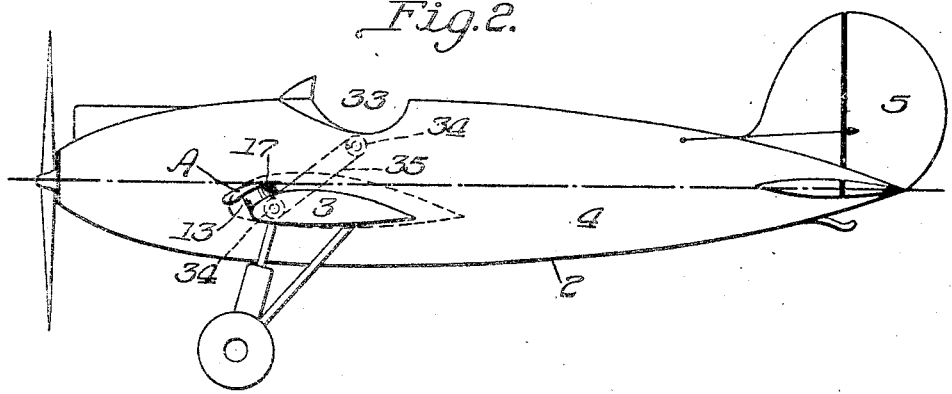
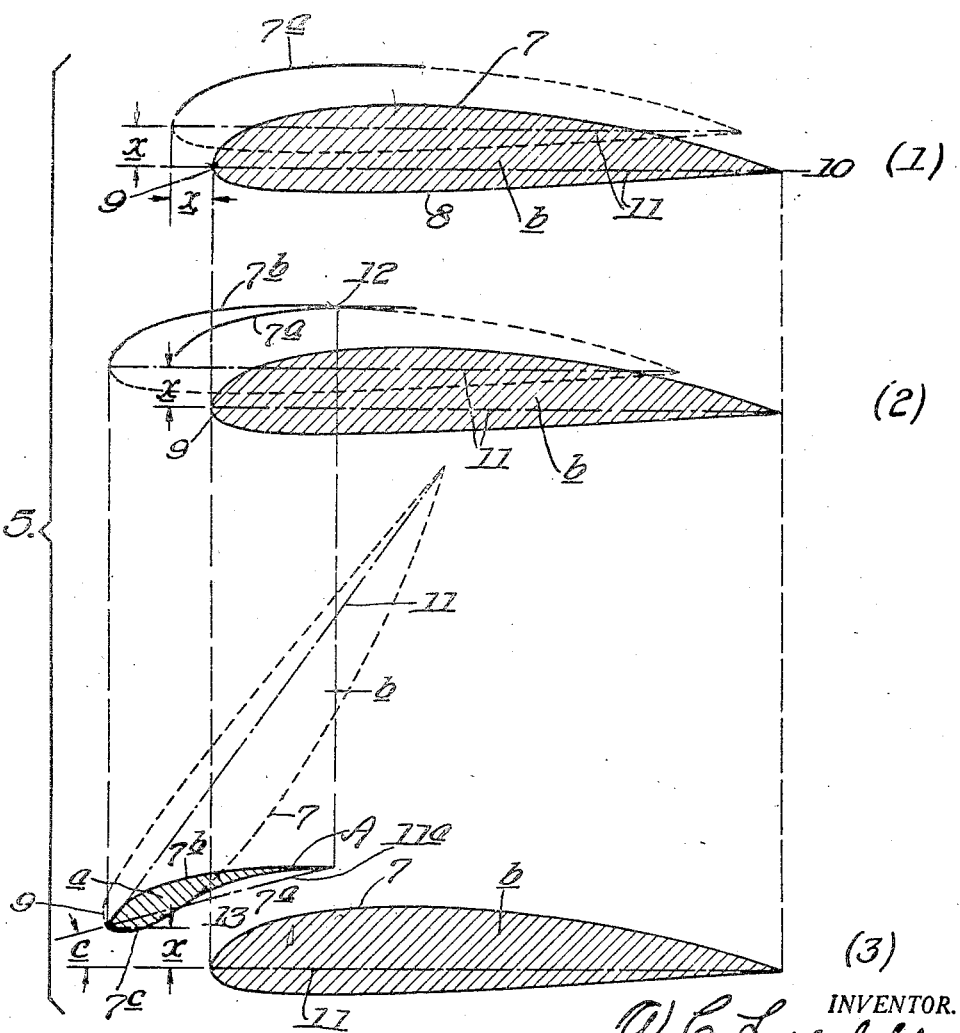

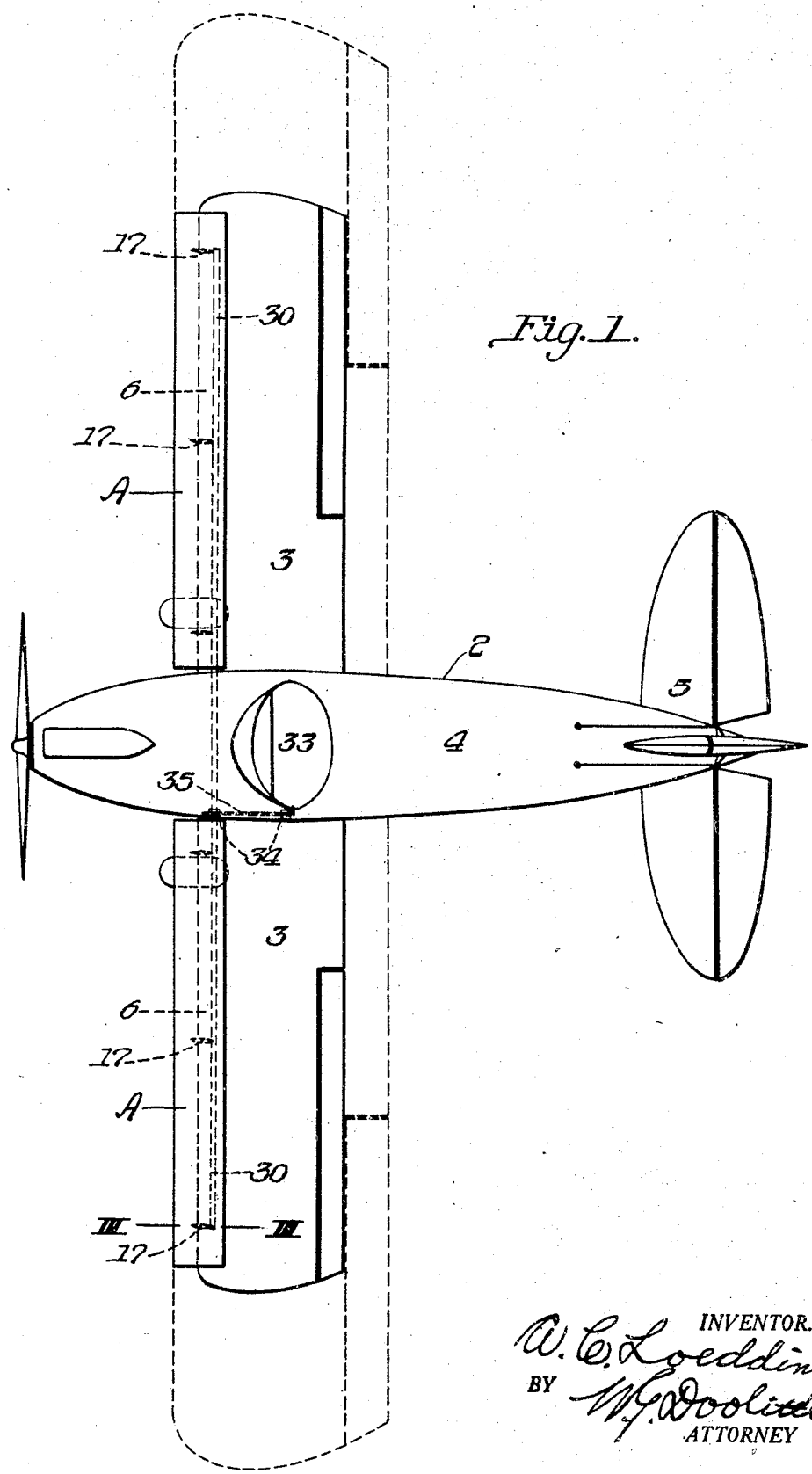

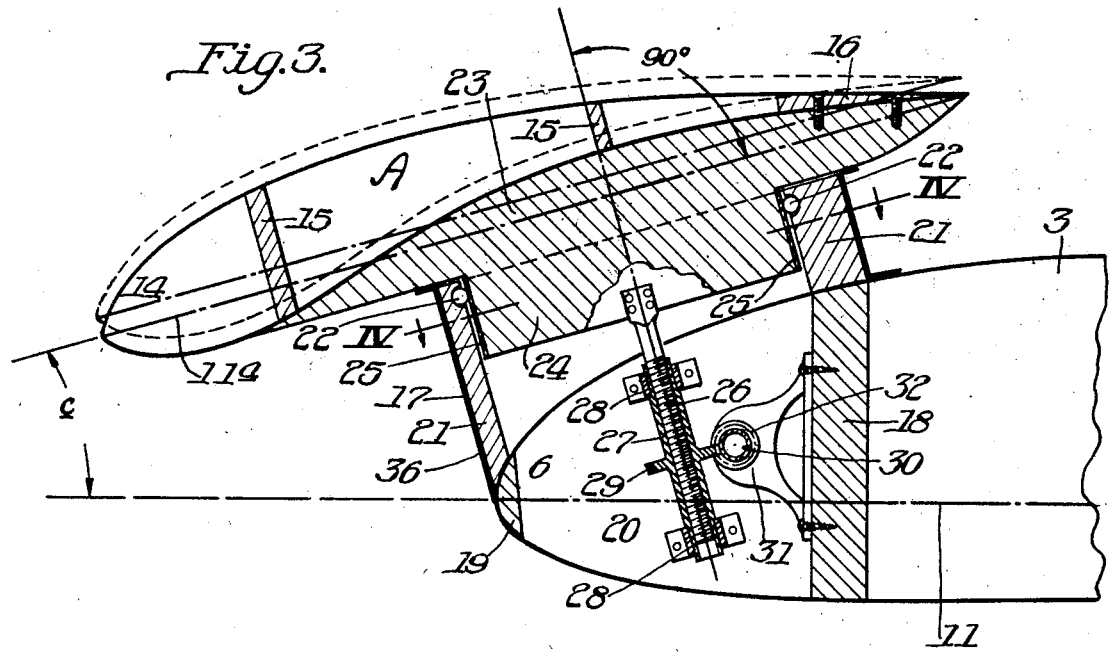
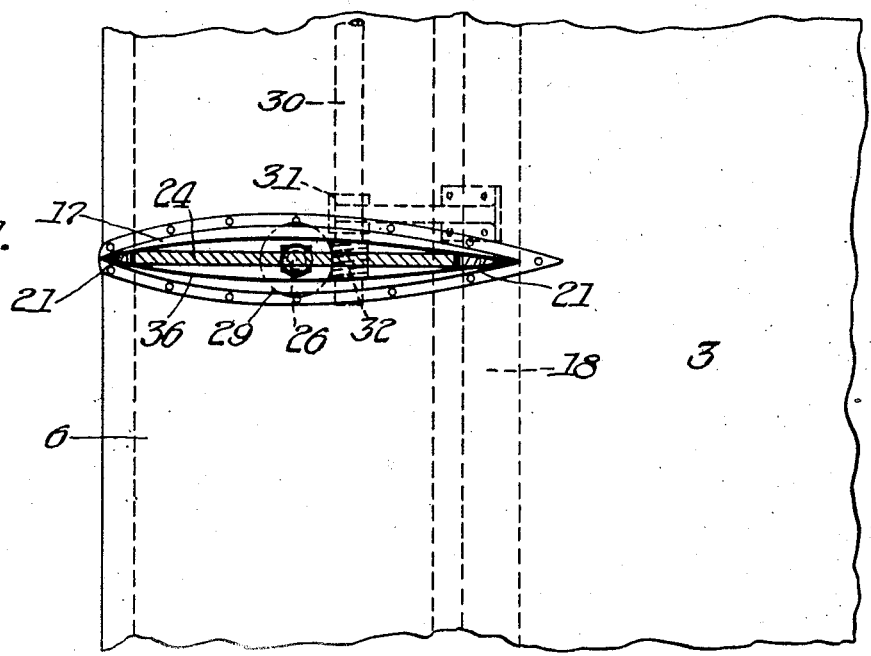

Patented Feb. 14, 1933

1,897,669

UNITED STATES PATENT OFFICE

ALFRED C. LOEDDING, OF BADEN, PENNSYLVANIA, ASSIGNOR OF ONE-FOURTH TO FRANK C. SCHROEDER, OF SEWICKLEY, PENNSYLVANIA

AIRPLANE

Application filed October 23, 1930. Serial No. 490,602.

My invention relates to improvements in airplanes, and especially to airplanes of the type embodying an auxiliary or supplemental airfoil or wing associated with the leading portion of the main airfoil or wing.

As heretofore constructed, the type of airplane mentioned has not proven satisfactory, especially due to the lack of lifting force effected for small angles of incidence of the flight of the airplane, due primarily to the construction of and/or the design of the auxiliary airfoil or airfoils and the location or position of the said airfoil or airfoils relatively to the main wing or airfoil or airfoils of the airplane.

The present invention contemplates a construction embodying means to effectively increase the lifting force and efficiency per unit of main wing area, and particularly for small angles of incidence of the flight of the airplane, whereby the main airfoil area may be materially reduced to carry greater loads than heretofore, and without increasing the motor power; the said construction further enables slower landing speeds than heretofore.

Among the objects of the present invention are, to provide in an airplane an auxiliary cambered airfoil having the curvature of its upper and lower cambers generated on or from the curvature of the leading upper camber of the main airfoil of the airplane, said upper and lower curvatures being direct functions thereof; to provide an airfoil characterized in that the curvature of its upper camber is substantially the same as the curvature of the leading upper camber of the main airfoil; to provide an auxiliary airfoil spaced from the leading portion of the main airfoil and adjustable with respect thereto by a movement thereof in a direction perpendicular to its aerodynamic chord; and to position the auxiliary airfoil above and spaced from the main airfoil, to provide an air passage or slot therebetween, said auxiliary airfoil being positioned so as not to mask the leading portion of the main airfoil.

Additional objects and advantages will become apparent from the following description taken in connection with the accompanying drawings, wherein:

Fig. 1 is a plan view of an airplane, showing my invention embodied therein;

Fig. 2, a side elevation thereof;

Fig. 3, an enlarged detail section view taken on the line III—III of Fig. 1, particularly showing the adjustable mounting the auxiliary airfoil;

Fig. 4, a section taken on line IV—IV of Fig. 3; and

Fig. 5, a diagrammatic view illustrating the steps in the method of designing my auxiliary airfoil.

Referring to the drawings, 2 designates generally an airplane of the monoplane type, having a pair of main airfoils or wings 3, a fuselage 4, and an empennage 5 of the usual and well known construction. The airfoils 3 are preferably designed in the conventional manner from an airfoil section of any standard design, and may be constructed in any suitable manner.

Adjustably mounted and positioned adjacent the leading portion or nose 6 of each of the main airfoils 3 and spaced therefrom, are auxiliary airfoils A, the said auxiliary airfoils preferably extending substantially the length of the main airfoils.

One of the important features of my invention resides in the configuration of the auxiliary airfoil or airfoils and the method or manner of designing the auxiliary airfoil section. As above stated, the main airfoil is formed from any standard airfoil section; such a section, for example, is shown by the hatched lines of Fig. 5 and is generally designated $b$. The said section $b$ is determined by an upper camber or curve 7, a lower camber or curve 8, a leading edge 9, and a trailing edge 10. The aerodynamic chord of said section, or the line joining the leading and trailing edges, is designated at 11.

The manner or method followed by me in designing or producing the desired auxiliary airfoil section is particularly shown in the diagrammatic view of Fig. 5. As indicated at (1) therein, the standard airfoil section $b$ is moved upwardly parallel to its aerodynamic chord 11, through any desired distance $x$, after which it is moved forwardly along a continuation of said chord for an equal distance. This position of the section $b$ determines a portion $7a$ of the lower camber of the auxiliary airfoil section $a$, the said camber portion being defined by the leading portion of the upper camber $7$ of the main or standard section $b$.

Then the section $b$ is moved forwardly along the said continuation of its chord in the above displaced position until the upper camber or curve $7$ of the section $b$ intersects the auxiliary section lower camber line $7a$ at $12$, the said point of intersection being at or about the point of maximum ordinate of the upper camber of the standard section $b$, that is to say, the maximum ordinate with respect to the aerodynamic chord $11$. The leading portion of the upper camber $7$ of the standard section $b$ in this position will define the upper camber $7b$ of the auxiliary section $a$, as clearly shown in part (2) of Fig. 5.

In the final step (3) of Fig. 5, the section $b$ in the position (2) is inverted and rotated about the point of intersection of its leading edge $9$ and its aerodynamic chord $11$, until the leading portion of the upper curve or camber $7$ thereof becomes tangent to the lower camber portion $7a$ as determined in part (1), thereby defining the lower camber or curve portion $7c$ of the auxiliary section $a$ to complete the same.

Thus, it will be seen that the auxiliary airfoil section $a$ is formed of a plurality of curves or cambers comprising functions or portions of a curve or camber of the main airfoil section $b$, and more specifically, the cambers of the said section $a$ are all defined by the leading portion of the upper curve or camber $7$ of the section $b$. It will be understood that the method or manner of designing, according to my invention, may be varied within the skill of the designer. For example, the point of intersection $12$ of the camber portion $7a$ and the camber $7b$ may be varied to alter the width of the resultant auxiliary airfoil section $a$.

It should further be understood that my invention contemplates an auxiliary cambered airfoil embodying a construction having the curvature of its upper camber substantially the same as the curvature of the leading upper camber of the main airfoil, regardless of the method followed in producing the said curvature, and that this applies also to the manner of producing the curvature of the lower camber of the auxiliary airfoil.

The said section $a$, completed as shown in part (3) of Fig. 5, will be disposed in such a manner that its aerodynamic chord $11a$ will be inclined at an angle of incidence $c$ with respect to the aerodynamic chord $11$ of the main airfoil section $b$. Also due to the manner of defining the portion $7a$ of the lower camber of the section $a$ from the leading portion of the upper camber $7$ of the main section $b$, in displaced relationship, the intervening space between the said cambers decreases in height rearwardly of the sections, thereby forming a Venturi passage therebetween.

Hence, by constructing the auxiliary airfoil A of a uniform section $a$, and positioning the said airfoil along the leading portion or nose $6$ of a main airfoil or wing $3$ having a uniform section $b$, in such a manner that the plane of the aerodynamic chords $11a$ of the auxiliary airfoil A is inclined at an angle $c$ with respect to the plane of the aerodynamic chords $11$ of the main airfoil, the Venturi passage will form a Venturi slot $13$ extending longitudinally of the wing structure. When so positioned, it will be seen that if the auxiliary airfoil A is moved in a direction perpendicular to the plane of its aerodynamic chords $11a$, the character of the Venturi slot $13$ will be maintained, and the auxiliary airfoil A will have a constant angle of incidence $c$ with respect to the main airfoil $3$.

It is also to be noted that when the section $a$ is designed in the manner of my invention, the leading edge portion or nose $14$ thereof is decidedly above and forward of the nose $6$ of the main airfoil section $b$, so that when the wing assembly is made as above, the nose of the auxiliary airfoil A will not mask the nose $6$ of the main airfoil $3$. Thus, when the airplane $2$ is in the normal flying position of Fig. 2, or when the angle of incidence of the airplane is zero, the wind may enter the Venturi slot $13$ between the auxiliary and the main airfoils. The passage of the wind therethrough will increase the velocity thereof, and at the same time be caused to follow the upper camber $7$ of the main airfoil rearwardly to increase the lift.

It has been found that the increased lift thus obtained is sufficient to permit a reduction in the conventional wing area of the main airfoil (indicated in the dotted lines of Figs. 1 and 2) as much as 40 percent. Also, this reduction in area may be effected without altering the landing speed and without increasing the motor power, and results in increased performance and maneuverability of the airplane.

As the airplane climbs with an increased angle of incidence, the volume of the air passing through the Venturi slot $13$ will be increased, thereby increasing the resultant lift. This increased lift is accomplished with comparatively small values of the angle of incidence of the airplane.

In the practice of my invention, the auxiliary airfoils A may be constructed in any desired manner; for example, a metallic covering formed into the design hereinbefore described may be secured to suitable spars $15$ and trailing edge members $16$. The auxiliary airfoils may be mounted on the main airfoils by means of a plurality of spaced-apart streamline supports, generally designated 17.

Some value of the height of the Venturi slot 13 will produce a condition of maximum efficiency with an increased lift. Therefore, the auxiliary airfoil A may be so positioned as to normally provide this condition of maximum efficiency, and suitable adjusting means may be provided within the control of the aviator for varying the height of the slot 13 to provide flexibility of operation of the airplane.

To this end, I have shown in Figs. 3 and 4 a preferred construction of the said means for adjustably mounting the auxiliary airfoils A on the said supports 17, which may be of hollow construction. Each of the main airfoils 3 are provided with a longitudinally extending forward spar 18 and a nose cap 19, preferably formed of wood. Immediately below the said supports are transverse bulkheads 20 secured to the spar 18 and the nose cap 19.

Extending upwardly from the upper camber 7 of the main wing 3 and forming a part of the supports 17 are provided parallel guides 21, securely fastened to the said spar and nose cap. The said guides are preferably disposed at right angles to the plane of the auxiliary airfoil section chords 11a. Bearing rollers 22 are rotatably disposed in suitable recesses in the inner faces of the guides. Spaced-apart metallic ribs 23 are secured to the spar members of the auxiliary airfoil A and are provided with depending portions 24 extending downwardly between the guides 21, the said depending portions having bearing faces 25 for the rollers 22.

Centrally secured to the lowermost portion of each of the depending rib portions 24, I provide an adjusting screw 26 adapted to be translated along an axis perpendicular to the plane of the auxiliary airfoil section chords 11a, by means of a threaded sleeve 27 rotatable in suitable bearings 28 mounted on the bulkhead 20. The said screw, sleeve and bearings are disposed within the main airfoil structure and forwardly of the forward spar 18 thereof. A spur gear or worm wheel 29 is preferably formed integrally with the sleeve 27.

To enable the adjustment of the screws 26 of each support 17 in unison, I provide a transverse torque tube 30 extending substantially the length of the auxiliary airfoils 3, as in Fig. 1, and through the fuselage 4. The said tube may be rotatably supported in the fuselage and in a plurality of spaced-apart bearings 31 secured to the forward spars 18 of the main wings 3. Spaced-apart worms 32 are secured to the tube 30 and are arranged in mesh with the gears 29 at each support 17. Thus, by rotating the torque tube 30, the auxiliary airfoils A may be adjusted to and from the leading portions of the main airfoils in the manner described. This may be done from the cock-pit 33 by the aviator, through the medium of sprockets 34 and a connecting chain 35.

A metallic or other covering 36 may be placed around the supports 17 to afford a streamline effect for reducing the air resistance, said cover being secured to the guides 21 and the upper camber 7 of the main airfoils 3.

The auxiliary airfoils will have a normal position angularly disposed with reference to the aerodynamic chord plane of the main airfoils and at such a distance from the said main airfoils that the height of the Venturi slot 13 will produce a condition of maximum efficiency with a high value of lift.

In operating an airplane so equipped, in the event of taking off, landing or flying in rarefied air, as in high altitude flying, the auxiliary airfoils may be moved away from the upper cambers of the main airfoils 3 by means of the torque tube 30 and its associated parts, to increase the height of the Venturi slot 13. This opening adjustment may be very small to produce increased values of lift with slight losses in efficiency. To operate at the maximum efficiency, as when cruising the airplane, the auxiliary airfoils are then adjusted to their normal position.

By means of my construction of the auxiliary airfoil, in combination with a standard sectioned main wing, the lift range of said main wing is not appreciably changed. In other words, the maximum lift under my construction occurs at an angle of attack of about 20 degrees, therefore enabling the airplane to make a conventional three-point landing. Heretofore, airplanes using auxiliary airfoils could not possibly make a conventional three-point landing and still utilize the maximum lift of their wings, because their maximum lift occurs at great angles of attack; viz: 24 to 30 degrees. The fact that my wing arrangement gives maximum lift at approximately twenty degree angle of attack does not make the airplane unsafe due to "burbling", which produces stalling, because experiments have shown that with my construction the lift decreases gradually at the burbling stage, instead of abruptly.

I claim:

1. In an airplane, a main airfoil, an auxiliary airfoil, said auxiliary airfoil having its nose spaced above and in advance of the nose of the main airfoil and being movable in a direction perpendicular to its aerodynamic chord plane, means for moving the auxiliary airfoil, and means for limiting the movement of the auxiliary airfoil towards the main airfoil to always maintain an air passage therebetween.

2. In an airplane, a main airfoil, an auxiliary airfoil, said auxiliary airfoil having its nose disposed above the intersection of the upper camber and the aerodynamic chord plane of the main airfoil, said auxiliary airfoil being movable in a direction perpendicular to its aerodynamic chord plane, means for moving the auxiliary airfoil, and means for limiting the movement of the auxiliary airfoil towards the main airfoil to always maintain an air passage therebetween.

3. In an airplane, a main cambered airfoil, an auxiliary cambered airfoil having a continuous upper camber and an irregular lower camber, said cambers being defined by the curvature of the leading upper camber of the main airfoil, said auxiliary airfoil being spaced above the main airfoil to form a continuously open air passage therebetween, movable in a direction perpendicular to its aerodynamic chord plane to vary said air passage.

4. In an airplane, a main cambered airfoil, an auxiliary cambered airfoil having a continuous upper camber and an irregular lower camber, said cambers being defined by the curvature of the leading upper camber of the main airfoil, said auxiliary airfoil being movable in a direction perpendicular to its aerodynamic chord plane and spaced above the main airfoil to form a continuously open air passage therebetween, said auxiliary airfoil having its nose disposed above the intersection of the upper camber and the aerodynamic chord plane of the main airfoil.

5. In an airplane, a main airfoil, an auxiliary airfoil disposed above the intersection of the upper camber and the aerodynamic chord plane of the main airfoil to provide a space therebetween, with the opening of the rear of the space less than the width of the opening at the front to produce a Venturi passage therebetween, means for moving said auxiliary airfoil in a direction perpendicular to its aerodynamic chord plane, and means interposed between the main and auxiliary airfoils limiting the movement of the auxiliary airfoil towards the main airfoil, whereby to always maintain the Venturi passage.

6. In an airplane, a main airfoil, an auxiliary airfoil continuously spaced from the main airfoil, means for moving the auxiliary airfoil in a direction perpendicular to its aerodynamic chord plane, said means including a rotatable torque tube, an adjustable threaded screw connected to the auxiliary airfoil, a rotatable sleeve in threaded engagement with the screw, a gear on the sleeve and a gear on the torque tube, said gears meshing to rotate the sleeve by a rotation of the tube, and means for limiting the movement of the auxiliary airfoil towards the main airfoil to always maintain an air passage therebetween.

7. The herein described method of defining the upper and lower cambers of an auxiliary airfoil, which consists in defining the upper and lower cambers of its airfoil section from a standard or pre-formed main airfoil section by first moving the standard section upwardly parallel to its aerodynamic chord and forwardly through equal distances, whereby a portion of the lower camber of the auxiliary section is defined by the forward upper camber of the standard section; then moving the standard section forwardly along a continuation of its aerodynamic chord until the upper camber thereof intersects the said portion of the lower camber of the auxiliary section at or about the point of maximum ordinate of the said upper camber, thereby defining the upper camber of the auxiliary section by the upper camber of the standard section; and finally completing the lower camber of the auxiliary section by inverting and rotating the said standard section about the intersection of its leading edge and its aerodynamic chord, until the forward upper camber of the said section becomes tangent to the aforesaid lower camber portion of the auxiliary section, thereby defining and completing the auxiliary section.

8. The herein described method of defining the upper camber of an auxiliary cambered airfoil from a standard or pre-formed main airfoil section, which consists in first moving the standard section upwardly parallel to its aerodynamic chord and forwardly through equal distances, whereby a portion of the lower camber of the auxiliary airfoil section is defined by the forward upper camber of the standard section, then moving the standard section forwardly along a continuation of its aerodynamic chord until the upper camber thereof intersects the said portion of the lower camber of the auxiliary section at or about the point of maximum ordinate of said upper camber.

9. In an airplane, a main cambered airfoil, an auxiliary cambered airfoil spaced from the main airfoil to provide a continuously open air passage therebetween, said auxiliary airfoil having a continuous upper camber defined by the curvature of the leading upper camber of the main airfoil.

10. In an airplane, a main cambered airfoil, an auxiliary cambered airfoil having a continuous upper camber and an irregular lower camber, said cambers being defined by the curvature of the leading upper camber of the main airfoil.

In testimony whereof I affix my signature.

ALFRED C. LOEDDING.